Figure 1:
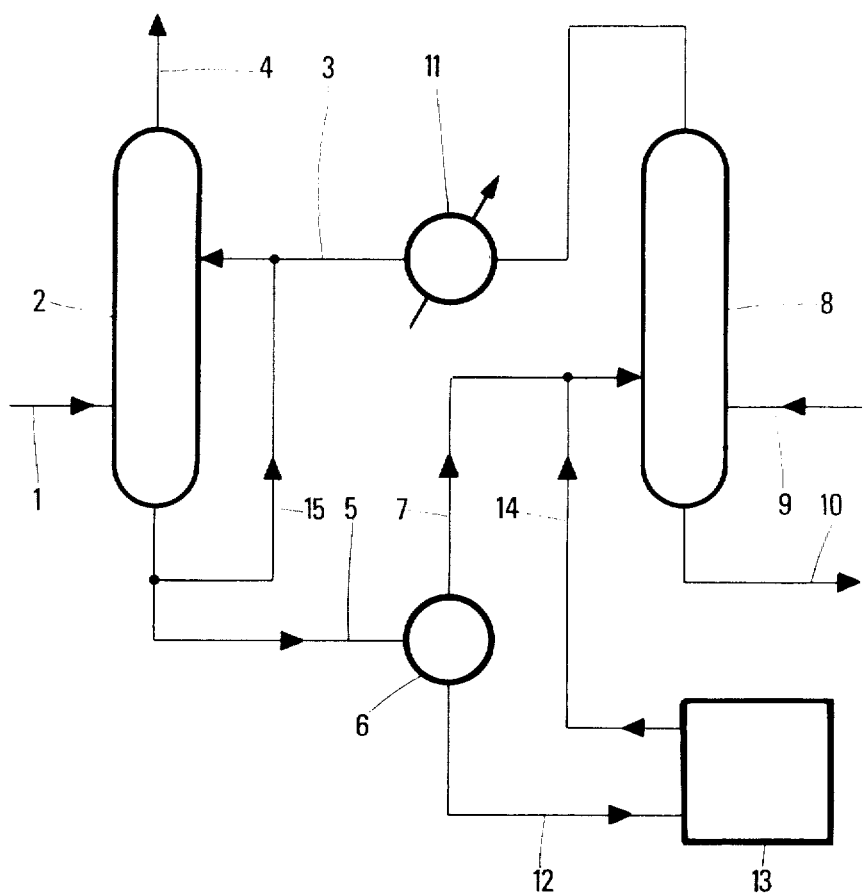

United States Patent [19]
Renault et al.

[11] 3,883,643
[45] May 13, 1975

[54] PROCESS FOR PURIFYING INDUSTRIAL GASES CONTAINING SULFUR DIOXIDES

[75] Inventors: Philippe Renault, Noisy-le-Roi; André Deschamps, Chatou; Claude Dezael, Maisons-Laffitte, all of France

[73] Assignee: Institut Francais du Petrole, des Carburants et Lubrifiants, Rueil-Malmaison, France

[22] Filed: June 6, 1972

[21] Appl. No.: 260,279

[30] Foreign Application Priority Data
June 7, 1971   France .............................. 71.20628
June 23, 1971  France .............................. 71.22966

[52] U.S. Cl. ................................ 423/574; 423/242
[51] Int. Cl. ....................... C01b 17/04; C01b 17/60
[58] Field of Search ........... 423/575, 573, 574, 512, 423/541, 220, 221, 222, 242, 243, 244, 517, 518, 519, 520, 545, 546, 547

[56] References Cited
UNITED STATES PATENTS
2,676,090  4/1954  Johnstone .......................... 423/242
3,383,170  5/1968  Furkert et al. ..................... 423/541
3,598,529  8/1971  Deschamps et al. ................ 423/575

OTHER PUBLICATIONS

Journal of the American Chemical Society, Vol. 65, 1943, Albertson, N and J. P. McReynold, pp. 1690–1691.

*Primary Examiner*—Oscar R. Vertiz
*Assistant Examiner*—Gary P. Straub
*Attorney, Agent, or Firm*—Millen, Raptes & White

[57] ABSTRACT

Process for purifying an industrial gas containing sulfur dioxide and oxygen and/or sulfur trioxide comprising contacting said gas with an aqueous solution of ammonia and/or ammonium neutral sulfite, vaporizing a portion of the water and decomposing the sulfites of the resulting solution to sulfurous anhydride and ammonia by heating without substantial decomposition of the sulfates, converting the ammonium sulfate to sulfurous anhydride and ammonia and reacting the sulfurous anhydride with hydrogen sulfide to produce sulfur which is separated.

1 Claim, 2 Drawing Figures

PROCESS FOR PURIFYING INDUSTRIAL GASES CONTAINING SULFUR DIOXIDES

It is known that many industrial gases, for example, the fumes from steam generating stations, contain sulfur dioxide and sulfur trioxide and that their discharge to the atmosphere results in pollution which is difficult to avoid in an economical manner.

As a general rule, sulfur dioxide is the prevailing gas and sulfur trioxide is only present in a relatively lower proportion.

It is nevertheless essential to provide for the removal of both gases if it is desired to lower the sulfur content of the industrial waste effluents to acceptable values.

The purification process of this invention presents the remarkable feature of lowering the $SO_2$ and $SO_3$ content of the industrial gases, particularly of the fumes discharged from the steam generating stations and of the gaseous effluents from chemical plants, by converting them to sulfur which may be easily stored, is not polluting and can be used in industry.

This process comprises several stages:

In a first stage, the raw gas, containing sulfur dioxide and oxygen and/or sulfur trioxide as an impurity, is contacted with an absorbing aqueous solution at a temperature usually from 0° to 100°C and preferably from 40° to 60°C.

The absorbing aqueous solution contains ammonia and/or neutral ammonium sulfite and may contain small amounts of hydrogen sulfide whose origin will be indicated hereinafter. The impure gas becomes purified and its $SO_2$ and $SO_3$ content is reduced, while the solution in enriched with $SO_2$ and $SO_3$ in the form of ammonium sulfites and sulfates which are in aqueous solution; the sulfites are mainly the ammonium neutral sulfite and/or hydrogen sulfite and the sulfates mainly comprise ammonium neutral sulfate. The sulfates result from the reaction of $SO_3$ with ammonia or ammonium sulfites, $SO_3$ being either issued from the treated gas or produced by oxidation of $SO_2$ by means of the air or the oxygen present in the absorption zone. The solution may also contain thiosulfates resulting from the reaction between the sulfites and the hydrogen sulfide.

The second stage of the present process consists of heating the solution of ammonium sulfites and sulfates to a sufficient temperature for vaporizing the water and for decomposing at least a major part of the sulfites without noticeably converting the sulfates (the ammonium neutral sulfate may however be converted to ammonium hydrogen sulfate; the thiosulfate may, in some cases, undergo a partial decomposition to sulfur, $SO_2$ and $NH_3$). This temperature is usually from about 110° to 180°C when the prevailing pressure is close to atmospheric. The process may however be carried out at any pressure. There are thus recovered, on the one hand, a gaseous phase mainly containing $SO_2$, $NH_3$ and $H_2O$ and, on the other hand, an essentially liquid phase containing ammonium sulfate (essentially ammonium hydrogen sulfate), optionally ammonium thiosulfate and still optionally ammonium sulfite. This phase may contain a substantial amount of water.

In a third stage, the liquid phase issued from the second stage is further heated, for example to a temperature from 180° to 350°C, preferably within the range of 220°–300°C, and is reacted at this temperature with a reducing agent selected from the group consisting of sulfur, hydrogen sulfide and ammonium thiosulfate.

The reactions are as follows:

2. $NH_4HSO_4 + S \rightarrow 3 SO_2 + 2 NH_3 + 2 H_2O$
3. $NH_4HSO_4 + H_2S \rightarrow 4 SO_2 + 3 NH_3 + 4 H_2O$
2. $NH_4HSO_4 + (NH_4)_2S_2O_3 \rightarrow 4 SO_2 + 4 NH_3 + 3 H_2O$ An excess of any one of the reactants may be used, if so desired. The reducing agent may consist of ammonium thiosulfate or of sulfur produced by its decomposition, as already mentioned in the description of the first and second stages. There can also be used carbon monoxide or hydrogen.

However in the case where the amount of ammonium thiosulfate would be insufficient for completing the above stated reactions, sulfur or hydrogen sulfide may be added for reducing the ammoniuum sulfate to a mixture of sulfurous anhydride and ammonia. Conversely, if the amount of ammonium sulfate is insufficient, there can be voluntarily added sulfuric acid or ammonium sulfate. The residue from the third stage, if any, consists essentially of ashes and may be rejected.

In a fourth stage, the gaseous phases containing water, sulfurous anhydride and ammonia or ammonium sulfites resulting from their recombination, issued from the second and third stages, are treated with hydrogen sulfide at a temperature from 100° to 200°C, preferably from 115° to 170°C.

The reaction is as follows:

$$SO_2 + 2H_2S \rightarrow 3 S + 2 H_2O$$

Ammonia normally does not react, but acts as a catalyst in the above reaction.

There is recovered sulfur, on the one hand and, on the other hand, an ammonia containing gas, vaporized water, as well as in some cases small amounts of unconverted sulfurous anhydride and/or hydrogen sulfide.

This gas, after cooling and condensation, may be recycled to the first stage of the process and thus reconstitute the absorption solution.

The stoichiometry of the reaction of the fourth stage is obtained with a molar ratio $H_2S/SO_2$ of 2/1. However, a different ratio may be voluntarily used, corresponding, for example, to an excess of hydrogen sulfide in order to form a greater amount of ammonium thiosulfate in the first stage zone. The ratio sulfate/thiosulfate may be thus adjusted in view of the reaction of the third stage.

The fourth stage is, preferably, carried out in the presence of an organic liquid. Various solvents may be used in this stage; there will be mentioned particularly, tetramethylenesulfone, N-methyl-pyrrolidone, heavy alcohols having, for example, from 12 to 20 carbon atoms, alcohol esters and, more generally, all the liquids which are inert at the reaction temperature with respect to such compounds as $H_2S$ and $SO_2$.

Preferably there will be used the following solvents which are remarkable by their excellent stability: alkyleneglycols, ethers and/or esters of alkyleneglycols, polyalkyleneglycols and their esters and/or ethers, and among these compounds, more particularly, ethyleneglycol, polyethyleneglycol, ethers and/or esters of polyethyleneglycols.

These solvents will be referred to by the general term "solvents of the glycol type."

There will be mentioned by way of non limitative examples: ethyleneglycol, triethyleneglycol, heptaethyleneglycol, 1,3-dipropyleneglycol, 1,4-tetrabutyleneglycol, polyethyleneglycol having an average molecular weight of about 400 and hexaethyleneglycol, mono-propyl ether, mono-acetate or mono-butyrate.

According to a particular embodiment, the process is carried out by passing directly from the first stage to the third stage while quickly raising the temperature from the level of the first stage to that of the third stage: the second stage is thus performed intermediately, directly in the apparatus in which takes place the third stage.

Figure 2:
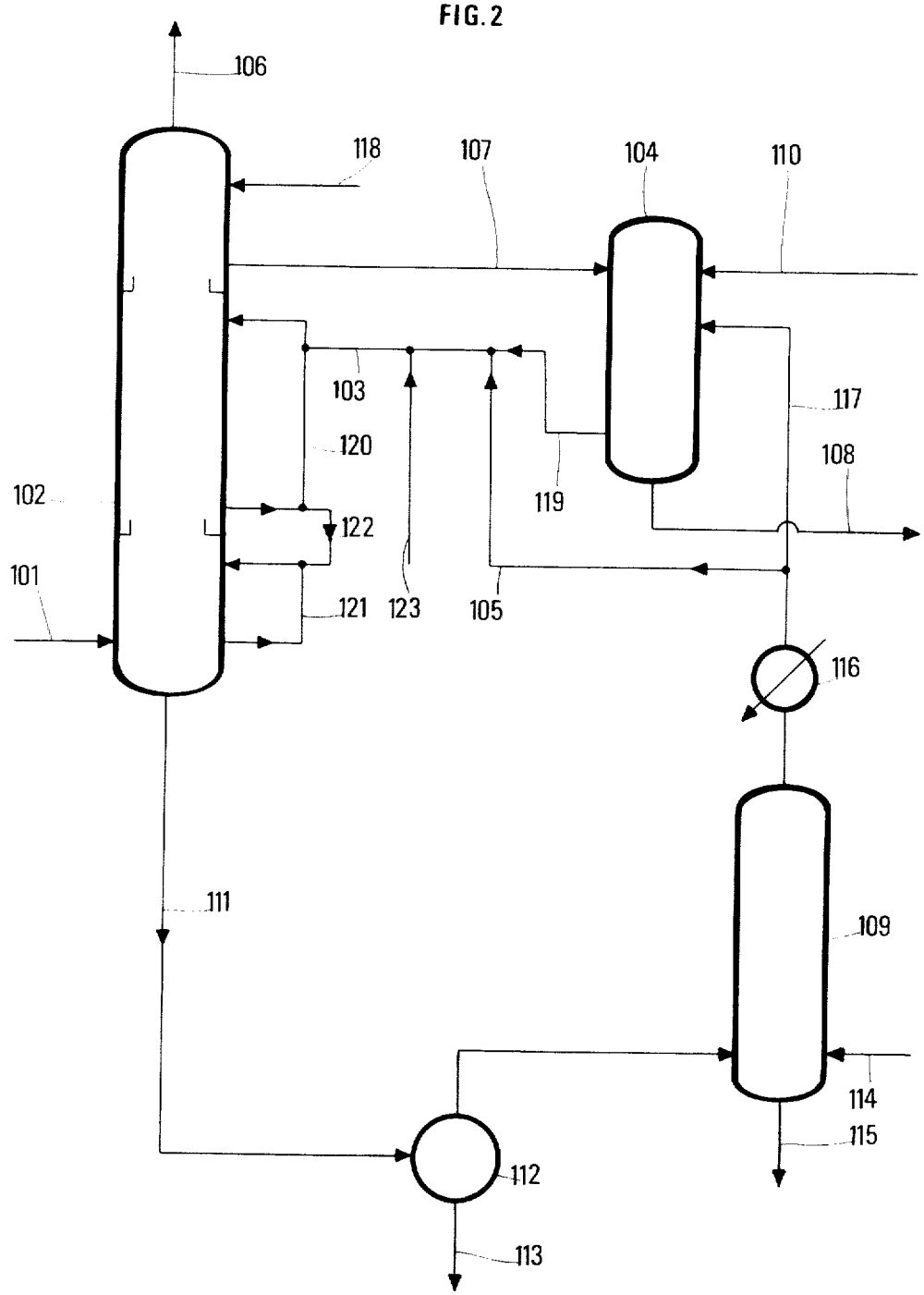

The invention will be further illustrated by the accompanying drawings given by way of non limitative example wherein;

FIGS. 1 and 2 are schematic representations of preferred embodiments of the invention.

Referring to FIG. 1, the gas to be purified, which contains $SO_2$ and a small proportion of $SO_3$, is conveyed through pipe 1 to scrubbing column 2 and the aqueous absorption solution is introduced through line 3. The purified gas is withdrawn through line 4. It may be subjected to an additional washing in order to recover the entrained ammonia, for example by washing with a solution of sulfuric acid or ammonium acid sulfate, which solution can be recycled to one of the units of the process. The used absorption solution may be recycled through line 15. At least one portion of the aqueous solution of ammonium sulfite is transferred through pipe 5 to the vaporizer 6. The vaporized phase is sent, through line 7, to the column 8 in which takes place the reaction with $H_2S$, introduced through line 9. This column contains, preferably, an organic liquid, for example a polyethyleneglycol. The formed sulfur is discharged through line 10. The vapors, essentially consisting of $NH_3$ and $H_2O$, are recycled through line 3 to the scrubbing column 2, after passage through the condenser 11 (the heat retained in 11 may be used for vaporizing the charge in 6). Traces of $H_2S$ and $SO_2$ may be present. The liquid which has been vaporized in 6 may be conveyed through line 12 to the reactor 13 where ammonium sulfate is reacted with ammonium thiosulfate and/or $H_2S$ or S. The resulting gases are fed to column 8 through pipe 14.

A second embodiment of the process is as follows:

In a first stage, an impure gas containing sulfur dioxide as an impurity is first contacted with an absorption aqueous solution, then with water, at a temperature from 0° to 100°C and preferably from 40° to 60°C. The absorption aqueous solution contains ammonia and/or neutral ammonium sulfite. The absorbing solution will have, for example, a normality from 0.1 N to 10 N in $NH_3$ or $NH_4$ and preferably from 1 N to 5 N. The impure gas issuing after purification, has a reduced $SO_2$ content while the absorption solution and the water are enriched with $SO_2$ in the form of ammonium sulfites in aqueous solution; the sulfites are essentially the ammonium hydrogen sulfite and/or neutral sulfite. In some cases, a small proportion of ammonium sulfates may also be present. The sulfates result from the reaction of $SO_3$ with ammonia or with ammonium sulfites, $SO_3$ originating either from the treated gas, or from the oxidation of $SO_2$ with air or the oxygen present in the absorption zone.

The contact between the gas to be purified and the absorption solution may be carried out in an apparatus separate from that used for the further washing of the gas with water. There may also be used a column with several stages, the washing with water being performed in the upper section with a withdrawal of liquid at the bottom of said upper section.

The absorption zone preceding the zone of washing with water may be divided in several sections within which is effected a recycling of the liquid. It is consequently possible to increase the efficiency of the absorption and to withdraw from the bottom an aqueous solution having a high concentration of ammonium sulfites.

The concentrated solution, issued from the first stage, has a concentration from 200 g/liter of ammonium sulfites up to the saturation and may advantageously contain 600 g/liter thereof.

The second stage of this embodiment consists of heating the concentrated solution of ammonium sulfites to a temperature sufficient for decomposing the sulfites. This temperature is generally of about 100° to 200°C when operating under a pressure close to atmospheric. It is however possible to operate under any different pressure. There is thus recovered on the one hand, a gaseous phase which mainly contains $SO_2$, $NH_3$ and $H_2O$ and, on the other hand, a liquid or solid phase containing ammonium sulfate.

Ammonium sulfate may be used as fertilizer or may be converted to other valuable products. For example, it may be reacted with sulfur, hydrogen sulfide or ammonium thiosulfate at a temperature of about 180°–350°C or even more in order to obtain sulfur dioxide and ammonia which can be used directly in the present process.

In a third stage of this embodiment, the gaseous phase containing water, sulfurous anhydride and ammonia or ammonium sulfites resulting from their recombination, issuing from the second stage, is treated with hydrogen sulfide at a temperature of from 100° to 200°C, preferably from 115° to 170°C: there are recovered, on the one hand, sulfur, and, on the other hand, a gaseous effluent containing ammonia, vaporized water, as well as in some cases small amounts of unconverted sulfurous anhydride and/or hydrogen sulfide. This gas, after cooling and condensation, is recycled to the first stage of the process and thus reconstitutes the absorption ammonia solution, at a relatively high concentration.

The stoichiometry of the reaction is obtained with a $H_2S/SO_2$ molar ratio of 2/1. However the reaction may be conducted with slightly different proportions of the reactants.

The third stage is preferably carried out in the presence of an organic liquid, for example one of those herein above described with respect to the fourth stage of the main process.

The fourth stage of this embodiment comprises concentrating the diluted aqueous solution of ammonium sulfite, issuing from the final washing of the gases with water: this solution is contacted with a weak anionic resin, for example a resin of the polyamine type. There will be mentioned for example, the following products commercially defined by the trade marks: Amberlite IR 45, IR 4 B, IRA 93, DUOLITE A-2, A-6 and A-114, DOWEX-3, DOWEX-4, LEWATIT M, PERMUTIT M and DEACIDITE IHP.

The resin retains $SO_2$ and leaves free passage to $NH_3$: consequently, there is issued from the resin bed, a very diluted $NH_3$ solution.

The resin may be periodically regenerated by means of a portion of the concentrated ammonia solution issued from the third stage of this embodiment: a relatively concentrated ammonium sulfite solution is withdrawn therefrom and sent back to the absorption column. The regeneration is advantageously followed with a washing of the resin with water. This embodiment is further illustrated in the Example following Example 1.

EXAMPLE 1

100 000 N m³/h of a fume containing by volume:

| $SO_2$ | $SO_3$ | $CO_2$ | $H_2O$ | $N_2$ | $O_2$ |
|---|---|---|---|---|---|
| 2 000 ppm | 50 ppm | 12 % | 12 % | 74 % | 2 % | are treated in a two-stage absorber (No 2 in FIG. 1), at a temperature of 50°C, by means of an aqueous absorption solution at the following concentrations of:

| $NH_4OH$ | $H_2S$ | $SO_2$ |
|---|---|---|
| 10 N | 0.15 N | 0.05 N | in the form of ammonium sulfites and sulfide.

The so-treated fumes have their $SO_2$ content reduced to 160 ppm and do not contain $SO_3$ at all.

There is recovered, at the bottom of the absorber, a brine of ammonium sulfite and sulfates having the following composition, in moles per liter:

| $SO_2$ | $NH_3$ | sulfate | $(NH_4)_2S_2O_3$ |
|---|---|---|---|
| 7.5 | 10 | 0.35 | 0.17 |

This brine is heated to 140°–160°C in a vaporizer 6 where 80% of the present sulfites are decomposed to gaseous $SO_2$ and $NH_3$ which are supplied to the reactor 8 for conversion of $SO_2$ to sulfur by reaction with $H_2S$. A large amount of water is simultaneously vaporized from the brine.

The effluent recovered from the bottom of the vaporizer has the following composition in percent:

| $SO_2$ | $NH_3$ | sulfate | $(NH_4)_2S_2O_3$ | $H_2O$ |
|---|---|---|---|---|
| 19.7 | 25.9 | 5.6 | 4.1 | 44.7 |

It is supplied to the reactor 13 wherein is performed, at 280°C, the reaction of decomposition of the sulfates by the ammonium thiosulfate. The vapors discharged from the outlet of this reactor contain only $SO_2$, $NH_3$ and $H_2O$. They are introduced into the reactor 8. In this reactor, pure $H_2S$ is introduced and there is recovered liquid sulfur from the bottom, and, at the top, vapors which, after condensation, have the composition of the absorption solution.

EXAMPLE 2

100 000 N m³ of a fume having the following volume content:

| $SO_2$ | $SO_3$ | $CO_2$ | $H_2O$ | $N_2$ | $O_2$ |
|---|---|---|---|---|---|
| 2000 ppm | 50 ppm | 12 % | 12 % | 74 % | 2 % | are treated in an installation of the type shown in FIG. 2. The fume is introduced through pipe 101 into the bottom of a column 102, wherein occurs in the lower part thereof, a partial absorption of $SO_2$ and the concentration of the ammonium sulfite solution which flows in the column, and, in the middle part thereof, the absorption of another portion of $SO_2$ by means of the ammonia solution issuing, through lines 119 and 103, from the stage of periodic regeneration of the ion exchange resins contained in column 104 and, through lines 105 and 103, from reactor 109. In the upper part of the column there is performed a scrubbing with water, introduced through line 118, of the last amounts of $SO_2$ and $NH_3$ which escape with the fume which, at the outlet 106, does not contain more than 100 ppm by volume of $SO_2$ and 80 ppm of $NH_3$.

The solution recovered in 107, contains 5.5 g/liter of ammonium hydrogen sulfite. It passes through the column 104 containing 2 m³ of DOWEX 3–X–8 resin, at 20–50 mesh. This resin retains the sulfurous anhydride. From 108 there is obtained an effluent containing a very small amount of ammonia, i.e. 0.9 g/liter. After one hour of operation, the ammonia hydrogen sulfite solution from line 107, is no longer conveyed to the column 104, but to a second identical column, not shown, and the regeneration of the resin is performed in column 104, with the use of the ammonia issuing from reactor 109 and passing through the condenser 116 and the duct 117. This ammonia solution liberates from the resin the sulfurous anhydride which is sent back to the absorption zone of the column through pipes 119 and 103.

After each regeneration, the resins are rinsed with water supplied from line 110 and which is fed back, through lines 119 and 103, to the column. The rinsing being taken into account, the average concentration of ammonium sulfites in pipe 111 amounts to 770 grams/liter.

The sulfites recovered at the bottom of the column, in pipe 111, are conveyed to an evaporator 112 at the bottom of which are discharged in 113 the ashes and the sulfates.

The vaporized effluent, consisting of $SO_2$, $NH_3$ and $H_2O$ is sent to the reactor 109 where is performed the conversion to sulfur with the use of a hydrogen sulfide make up, through line 114, in the presence of polyethyleneglycol having an average molecular weight of 400. Sulfur is recovered in 115.

The vapors evolving from the top of the reactor, and containing essentially water and ammonia, are condensed in 116, producing ammonia which will be used for regenerating the resins (line 117) and for the absorption of $SO_2$ (lines 105 and 103). An ammonia make up may be added from line 123.

When the resin of the column 104 has been regenerated, this column can start running again and the resin may be regenerated in the second column (not shown).

In addition, for increasing the flow rate of the washing liquid through column 102, there may be provided partial recycling circuits, such as 120 and 121. The flow of the liquid, from one stage to the other in the column 102, may however be performed either inside the column itself, or through pipes such as 122.

What we claim as this invention is:

1. A process for purifying an industrial gas which simultaneously contains sulfur dioxide and at least one of oxygen and sulfur trioxide, comprising the steps of:
   a. contacting said gas with an aqueous solution of ammonia and/or of ammonium sulfite in a contact zone so as to form additional ammonium sulfite and sulfate in said aqueous solution, and then separating the gas from said aqueous solution,
   b. contacting the gas separated from the aqueous solution in step a) with water in an additional contact zone at 0°–100°C, so as to obtain a dilute aqueous solution of ammonium sulfite and a further purified gas, c. alternatively contacting said dilute solution of ammonium sulfite with a first bed and a second bed of weak anionic resin, thereby retaining $SO_2$ thereon and recovering therefrom dilute ammonia solution, d. heating the aqueous solution separated from step a) to form a gaseous mixture of $H_2O$, $SO_2$ and $NH_3$, e. reacting said gaseous mixture from step (d) with $H_2S$ in a reaction zone to form sulfur and recovering ammonia therefrom, f. alternatively passing a portion of recovered ammonia in the condensed form through said first bed and said second bed of weak anionic resin to form a solution of ammonium sulfite, provided one only of the beds is contacted with said condensed form while the other is contacted with the dilute solution of step (c), and g. passing said solution containing ammonium sulfite recovered from step (f) to the contact zone of step (a).

* * * * *